United States Patent Office 3,446,723
Patented May 27, 1969

3,446,723
ELECTRODEPOSITION OF A COPOLYMER CONTAINING BASIC NITROGEN ATOMS
Heinz Pohlemann, Limburgerhof, Pfalz, Herbert Spoor, Mutterstadt, Pfalz, and Ernst Becker, Ludwigshafen am Rhine, Germany, assignors to Badische Anilin- & Soda-Fabrik Aktiengesellschaft, Ludwigshafen am Rhine, Germany
No Drawing. Filed July 6, 1966, Ser. No. 563,071
Claims priority, application Germany, July 9, 1965, B 82,750
Int. Cl. C23c *13/04*
U.S. Cl. 204—181                                8 Claims The present invention relates to a method of producing coatings, particularly baking lacquer coatings, on electrically conducting substrates, particularly metal substrates, in which from aqueous solutions or aqueous dispersions of salts of nitrogen basic polymers, the cationic polymers are electrochemically deposited on the substrates in the form of coatings by cataphoresis and then, in the case of baking lacquer coatings, baked. This method is hereinafter called cataphoresis method.

It is known that coatings, particularly baking lacquer coatings, may be prepared on electrically conducting substrates, particularly metal substrates, by electrochemically depositing the polymers on the substrates by means of anaphoresis from aqueous solutions or aqueous dispersions of salts of polymers having carboxylic acid groups, followed, in the case of baking lacquer coatings, by baking. This method will hereinafter be referred to as anaphoresis method. A peculiarity of the anaphoresis method is that not only are the polymers deposited on the substrates (the anode), but also nascent oxygen is developed at the substrates and (when the articles consist of base metals) metal ions may pass into solution. The two last-mentioned phenomena are often disadvantageous because nascent oxygen may react with the polymers in an undesirable manner and metal ions may decrease the waterproofness of the coatings and discolor them (the latter occurring particularly in the case of substrates of copper or copper alloys).

On the other hand it is a peculiarity of the cataphoresis method that although the polymers are deposited on the substrate (cathode) in this case, too, hydrogen develops at the substrates and no metal ions pass into solution, even when the substrates consist of base metals. Since hydrogen in general hardly reacts with the polymers in an undesirable manner, the preparation of coatings by cataphoresis has, in this respect, advantages over the preparation of coatings by anaphoresis. It has however not hitherto been possible to develop salts of nitrogen basic cationic polymers from whose aqueous solutions or aqueous dispersions the polymers may not only be deposited by cataphoresis but will give coatings which have to a great extent the properties desired in coatings, such as strength of bond to the substrate, hardness, elasticity, and resistance to water and solvents.

The object of the present invention is to provide a process for applying a coating onto an electrically conducting substrate by cataphoretic deposition of a copolymer from an aqueous bath containing an ammonium salt of said copolymer, which coating has good bond strength, good hardness, good elasticity and good resistance to water and solvents, that means which has most of the properties desired in coatings.

Another object of the invention is to provide a cataphoresis method of depositing polymers from an aqueous bath which has good stability and makes it possible to coat many substrates in the same bath.

We have now found that the said object can be achieved by the use of an aqueous bath which contains in aqueous solution or aqueous dispersion an ammonium salt of a special copolymer having basic nitrogen atoms from which the copolymer is deposited.

In a process for the production of a polymer coating on an electrically conducting substrate by electrochemical deposition of a polymer having basic nitrogen atoms onto the substrate by cataphoresis from an aqueous bath containing an ammonium salt of said polymer, followed where applicable by baking the deposited coating, the improvement according to the present invention comprises depositing on said substrate a copolymer which contains in polymerized form units of:

(1) 3 to 30%, preferably 5 to 20%, by weight of at least one N-aminoalkyl-amide of acrylic acid and/or methacrylic acid having 1 to 6 carbon atoms in the alkylene group;

(2) 3 to 30%, preferably 5 to 30% by weight of one or more amides of acrylic or methacrylic acid having the formula

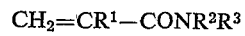

$$CH_2=CR^1-CONR^2R^3$$

wherein $R^1$ is a member of the class consisting of hydrogen and methyl and $R^2$ and $R^3$ are identical or different members selected from the group consisting of hydrogen, alkyl having 1 to 8 carbon atoms, hydroxyalkyl having 1 to 4 carbon atoms and oxaalkyl having 2 to 8 carbon atoms;

(3) 40 to 94%, preferably 50 to 90% by weight of one or more copolymerizable monomers selected from the class consisting of alkyl esters of acrylic acid or methacrylic acid, styrene, and alkyl-substituted styrenes having 1 to 3 carbon atoms in the alkyl radical;

(4) 0 to 30%, preferably up to 20% by weight of one or more other copolymerizable ethylenically unsaturated monomers.

The percentages refer to the nitrogen basic copolymer and add up to 100%

The following may be said regarding the components which go to make up the copolymers to be used in accordance with this invention:

(1) N-aminoalkylamides which have the formula

$$CH_2=CR^1CO-NR^4-(C_nH_{2n})-NR^2R^3$$

wherein $R^1$ is a member of the class consisting of hydrogen and methyl, $R^2$, $R^3$ and $R^4$ are identical or different members of the class consisting of hydrogen and alkyl having 1 to 4 carbon atoms, $n$ is one of the integers from 1 to 6, preferably 2 to 6 are very suitable. Those are particularly suitable, in whose formula $R^4$ denotes a hydrogen atom, and $R^2$ and $R^3$ denote identical or different alkyl groups having 1 to 4 carbon atoms and

$$-(C_nH_{2n})-$$

denotes a linear alkylene group with 2 to 6 carbon atoms having the two valencies at the terminal carbon atoms. Examples of suitable N-aminoalkylamides are aminomethylamide, 1-aminoethyl-(2)-amide, 1-aminopropyl-(2)-amide, N-1-(N'-butylamino)-propyl-(3)-amide and 1-aminohexyl-(6)-amide, and especially 1-(N',N'-dimethylamino)-ethyl-(2)-amide, 1-(N',N'-dimethylamino)-propyl-(3)-amide and 1-(N',N'-dimethylamino)-hexyl-(6)-amide. The production of the N-aminoalkylamides may be carried out by conventional methods, for example by reaction of lower esters or halides of acrylic acid or methacrylic acid with appropriate diamines.

(2) Suitable amides having the formula

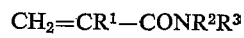

$$CH_2=CR^1-CONR^2R^3$$

are acrylamide and methacrylamide; examples of suitable N-alkylamides are the N-alkylamides of acrylic and/or methacrylic acid having 1 to 4 carbon atoms in the alkyl group, such as N,N-dimethylamide and N-butylamide; suitable N-hydroxyalkylamides are those with 1 to 4 carbon atoms in the hydroxyalkyl group, especially N-methylolamides; suitable N-oxaalkylamides (which may also be named N-alkoxyalkylamides) are particularly those having 2 to 8 carbon atoms in the oxaalkyl radical and especially N-2-oxaalkylamides having 2 to 5 carbon atoms in the oxaalkyl radical of which are preferred those which have the grouping —NH—CH$_2$OR wherein R is an alkyl group having 1 to 4 carbon atoms. Examples are the N-2-oxapropylamides and the N-2-oxahexylamides of acrylic acid and methacrylic acid. The N-2-oxahexylamides are very suitable.

(3) Suitable alkyl esters of acrylic acid and/or methacrylic acid are the esters having one to eight carbon atoms in the alkyl radical, especially esters of alkanols having one to eight carbon atoms. Examples of preferred esters are the methyl, ethyl, n-propyl, isopropyl, n-butyl, isobutyl and tertiarybutyl esters of acrylic acid and methacrylic acid.

Styrene itself is particularly suitable among the styrenes, but alkyl-substituted styrenes having 1 to 3 carbon atoms in the alkyl radical may be used instead of or together with styrene. Examples are the α-alkylstyrenes such as α-methylstyrene, o-alkylstyrenes, m-alkylstyrenes, and p-alkylstyrenes such as o-, m-, and p-vinyltoluene.

(4) Examples of very suitable other ethylenically unsaturated comonomers are hydroxyalkyl esters of acrylic and/or methacrylic acid having two to six carbon atoms in the hydroxy alkyl radical, such as the 2-hydroxyethyl esters, 2-hydroxypropyl esters and 4-hydroxybutyl esters, and also for example vinyl esters of aliphatic alkanemonocarboxylic acids having two to five carbon atoms, vinyl ethers of alkanols having 1 to 4 carbon atoms, the nitriles of acrylic and methacrylic acid and (N,N,N-tri-($C_1$–$C_4$-alkyl)-ammonium)-($C_1$–$C_6$-alkyl) esters of acrylic and/or methacrylic acid having identical or different alkyl radicals on the nitrogen atom, and also monocyclic or bicyclic compounds having a five-membered to six-membered heterocycle which contains one to three hetero atoms and at least one basic nitrogen atom, one hetero atom being a nitrogen atom bearing a vinyl group, such as N-vinylimidazoline and N-vinylimidazole. It is preferred not to use monomers which introduce anionic groups, such as carboxylic acid, carboxylate, sulfonic acid groups and the like, into the resulting copolymer.

In general it has proved to be advantageous for the copolymers to have K-values of 12 to 40 (as determined by the method of H. Fikentscher, Cellulosechemie 13 (1932), 12–25).

Preparation of the copolymers may be carried out by conventional methods; it is not the subject of the present invention. It has proved to be advantageous to prepare the copolymers by solution addition polymerization in organic solvents which may contain small amounts (up to about 10%) of water. Those solvents or mixtures of solvents which have a solubility in water of at least 30 g./l. are particularly suitable as solvents. Such solvents or mixtures of solvents need not be removed or need only be partly removed (for example by distillation) in the production of the aqueous solutions or aqueous dispersions. Examples of suitable solvents are aliphatic alcohols having 1 to 5 carbon atoms, such as methanol, ethanol, propanol, isopropanol, butanol and isobutanol, aliphatic ketones and cyclic ethers, such as acetone, dioxane and tetrahydrofuran; examples of suitable mixtures are mixtures of alcohols and aromatic hydrocarbons, such as butanol and xylene; propanol and toluene; and dioxane and amyl acetate. Suitable methods for the production of the copolymers by solution polymerization are for example described in Houben-Weyl, "Methoden der organischen Chemie," vol. XIV/1, pp. 1,044 to 1,047 (section α) and pp. 774 to 782 (section ββ).

Production of the salts of the addition copolymers may also be carried out by conventional methods; it is not the subject of the present invention. The salts may be prepared for example by bringing acids or substances which react like acids into contact with the copolymer. It is also possible however to bring the acid component into contact with the monomeric components of the copolymer prior to or during the copolymerization. Examples of suitable acids or substances which react like acids are mineral acids, such as hydrochloric acid, sulfuric acid and phosphoric acid, and aliphatic mono- and dicarboxylic acids having 1 to 10, preferably 1 to 5 carbon atoms and their anhydrides, such as acetic acid, maleic anhydride and formic acid.

Production of the aqueous solutions or aqueous dispersions of the salts of the copolymers may also be carried out by conventional methods; it is not the subject of the present invention. For example one suitable method consists in preparing dispersions from water and from solutions of the copolymers in organic solvents, and then adding to the dispersions obtained the acid components. Another suitable method consists for example in introducing the salts of the copolymers as such or in the form of their solutions in organic solvents into water. In general it is advantageous to select such operating conditions that the total amount of the salt is present in the form of an aqueous solution or that the greater part of the salt is present as an aqueous solution and the lesser part in the form of a dispersion. Furthermore it is generally advantageous for the pH value of the solutions or dispersions to be adjusted to 1 to 8, preferably 3 to 6. This is generally the case when 0.2 to 1.5 acid equivalents of the acid component are present per base equivalent of the aminoalkyl ester component of the copolymer. Finally it is advantageous for the solutions or dispersions to be so made up prior to use that they contain a total of 3 to 20% by weight of the salt.

The aqueous solutions or aqueous dispersions of the salts of the copolymers may also contain other water-soluble or water-dispersable curable condensates as binders capable of being deposited electrochemically with the salts by means of cataphoresis. Examples of suitable binders of this type are aminoplast condensates having methylol groups, such as urea formaldehyde, melamine formaldehyde, dicyandiamide formaldehyde condensates, glyoxal diureine formaldehyde condensates and phenoplast condensates having methylol groups, epoxide resins such as the polyglycidyl ethers of glycol, glycerol, pentaerithritol and bisphenols, alkyd resins or mixtures of such binders. In general, the amount by weight of these additional other binders should advantageously not be larger than the amount by weight of the salt of the copolymer and usually is from 10 to 70% of the weight (dry) of the polymer salts. The solutions or dispersions may also contain, in admixture with the salts, auxiliaries which are capable of being deposited electrochemically by cataphoresis, such as pigments, cure catalysts and agents for improving flow.

Production of coatings from the aqueous solutions or aqueous dispersions on electrically conducting substrates, particularly metal substrates, is effected by means of cataphoresis by electrochemical deposition followed, in the case of baking lacquer coatings, by baking. Here again conventional methods may be used; the substrate or article to be coated is introduced into the solution or dispersion of the polymer salts and made the cathode; another electrically conducting medium is also brought into contact with the solution or dispersion and made the anode. Since it is usually an advantage if no ions pass from the anode into the solution or dispersion of the polymer salts being used for coating, it is in general recommendable to use an anode of an appropriate material, such as carbon or precious metal, or to separate the anode chamber by a diaphragm from the solution of dispersion. Coating itself may advantageously be carried out by means of a D.C. current of 2 to 300, preferably 20 to 150, volts; the temperature in the bath may advantageously be 10° to 50° C., preferably 20° to 40° C. The period of coating is in general about 0.5 to 3 minutes. After the coating has been applied, the coated substrates are removed from the solutions or dispersions, advantageously rinsed with water and may advantageously be kept for 5 to 180, preferably 20 to 60, minutes at temperatures of 80° to 250° C., preferably 120° to 170° C., for baking.

The method according to this invention is especially suitable for the production of baked coatings on metal articles and it is a particular advantage that not only substrates of iron and iron alloys, such as sheets or parts of car bodies, can be provided with high grade coatings, but also articles of other metals, such as copper or copper alloys. The process is moreover suitable for the production of coatings on other electrically conducting substrates, such as plastics with a metallized surface, for example copper plated sheets, and graphitized textile fabrics.

The invention is further illustrated by the following examples in which parts and percentages are by weight.

EXAMPLE 1

A solution of a copolymer prepared in the conventional way by solution polymerization of 10 parts of the N-1-(N',N'-dimethylamino)-propyl-(3-)amide of acrylic acid (1), 20 parts of the N-2-oxa-4-methylpentylamide of methacrylic acid (2), 20 parts of methyl methacrylate (3a) and 50 parts of tertiary-butyl acrylate (3b) in 100 parts of a mixture of equal parts of n-butanol and p-xylene is diluted with water to a solids content of 8% and adjusted to a pH value of 6 by adding acetic acid.

A deep drawing steel sheet is dipped into the solution and made the cathode, the antipole being the vessel of stainless steel which holds the solution. A coating is deposited on the sheet steel during the course of one minute by means of a D.C. current of 40 volts. The sheet is rinsed with water and baked for twenty minutes at 170° C. It then has the following data: thickness of layer, 25 microns; Erichsen elasticity, 4.9; pendulum hardness, 120"; waterproofness, no recognizable attack by water after 500 hours; resistance to 1% caustic soda solution at room temperature, no recognizable attack by the agent after 100 hours.

By following the above procedure while using a clean brass sheet instead of the steel sheet, a clear coating is obtained through which the color of the brass may be seen unchanged.

EXAMPLE 2

A solution of a copylmer prepared by a conventional method of solution polymerization from 10 parts of N-1-(N',N'-diethylamino)-propyl-(3)-amide of acrylic acid (1), 5 parts of acrylamide (2), 40 parts of n-butyl acrylate (3a), 35 parts of tertiary-butyl acrylate (3b) and 10 parts of 4-hydroxybutyl acrylate (4) in 100 parts of a mixture of equal parts of n-butanol and p-xylene has added to it 0.5 mole of acetic acid per mole of N-1-(N',N'-diethylamino)-propyl-(3)-amide units of the copolymer and the mixture is mixed in the ratio of solids 90:10 with a water-soluble melamine-formaldehyde resin, partly etherified with methanol, such as is conventionally used in baking lacquers. The mixture is adjusted with water to a viscosity suitable for pigmentation, 13 parts of titanium dioxide pigment is added and the whole is homogenized in a ball mill and diluted with more water to a total solids content of 8%.

A deep drawing steel sheet is dipped as cathode into this formulation and provided with a coating during one minute by means of a D.C. current of 50 volts. The coating is then baked for twenty minutes at 170° C. The coating is waterproof and does not yellow.

Coatings having approximately the same good properties are produced by using a salt from maleic acid and a copolymer prepared by copolymerization of 3 parts of N-aminoethylacrylamide (1a), 8 parts of N,N-di-(N',N'-diethylamino)-ethylamide of acrylic acid (1b), 3 parts of N-ethylmethacrylamide (2a), 4 parts of N'-methylolmethacrylamide (2b), 35 parts of styrene (3a), 10 parts of tertiary-butyl acrylate (3b), 30 parts of n-butylacrylate, 5 parts of acrylonitrile and 3 parts of N-vinylimidazole.

We claim:

1. In a process for the production of a polymer coating on an electrically conducting substrate wherein a polymer having basic nitrogen atoms is electrochemically deposited on the substrate by cataphoresis from an aqueous bath containing an ammonium salt of said polymer, the improvement which comprises depositing on said substrate a copolymer which contains in polymerized form units of:
   (1) 3 to 30% by weight of an N-aminoalkylamide of acrylic or methacrylic acid having 1 to 6 carbon atoms in the alkylene group;
   (2) 3 to 30% by weight of at least one amide of acrylic and methacrylic acid having the formula $$CH_2=CR^1-CONR^2R^3$$

wherein $R^1$ is a member selected from the class consisting of hydrogen and methyl and $R^2$ and $R^3$ are members selected from the class consisting of hydrogen, alkyl having 1 to 8 carbon atom, hydroxyalkyl having 1 to 4 carbon atoms and oxaalkyl having 2 to 8 carbon atoms;
   (3) 40 to 94% by weight of at least one copolymerizable monomer selected from the class consisting of alkylesters of acrylic acid and methacrylic acid having 1 to 8 carbon atoms in the alkyl radical, styrene and alkyl-substituted styrenes having 1 to 3 carbon atoms in the alkyl radical;
   (4) 0 to 30% by weight of at least one other copolymerizable ethylenically unsaturated monomer.

2. A process as claimed in claim 1 wherein the monomeric component (1) has the formula $$CH_2=CR^1-CONR^4-(C_nH_{2n})-NR^2R^3$$

wherein $R^1$ is a member selected from the class consisting of hydrogen and methyl, $R^2$, $R^3$ and $R^4$ are members of the class consisting of hydrogen and alkyl having 1 to 4 carbon atoms, $n$ is one of the integers from 1 to 6.

3. The process as claimed in claim 1 wherein the monomeric component (4) is at least one member selected from the class consisting of hydroxyalkyl esters of acrylic and methacrylic acid having 2 to 6 carbon atoms in the hydroxyalkyl radical, vinyl esters of aliphatic alkane monocarboxylic acids having 2 to 5 carbon atoms, vinyl ethers of alkanols having 1 to 4 carbon atoms and nitriles of acrylic acid and methacrylic acid.

4. The process as claimed in claim 1 wherein the deposited coating is baked at a temperature of 80° to 250° C.

5. A process as claimed in claim 1 wherein the monomeric component (2) is the N-2-oxa-hexylamide of acrylic or methacrylic acid.

6. A process as claimed in claim 1 wherein the monomeric component (1) is the N-(N',N'-dimethylamino)-propylamide of acrylic or methacrylic acid.

7. A process as claimed in claim 1 wherein the monomeric component (2) is the N-2-oxa-propylamide of acrylic and methacrylic acid.

8. An improved polymer coating on an electrically conducting substrate obtained by the cataphoretic deposition from an aqueous bath of a copolymer having basic nitrogen atoms and containing in polymerized form units of:
   (1) 3 to 30% by weight of an N-aminoalkylamide of acrylic or methacrylic acid having 1 to 6 carbon atoms in the alkylene group;
   (2) 3 to 30% by weight of at least one amide of acrylic and methacrylic acid having the general formula $$CH_2=CR^1-CONR^2R^3$$

wherein $R^1$ is a member of the class consisting of hydrogen and methyl and $R^2$ and $R^3$ are members selected from the group consisting of hydrogen, alkyl having 1 to 8 carbon atoms, hydroxyalkyl having 1 to 4 carbon atoms and oxaalkyl having 2 to 8 carbon atoms;

(3) 40 to 94% by weight of at least one copolymerizable monomer selected from the class consisting of alkyl esters of acrylic acid and methacrylic acid having 1 to 8 carbon atoms in the alkyl radical, styrene and alkyl-substituted styrenes having 1 to 3 carbon atoms in the alkyl radical;

(4) 0 to 30% by weight of at least one other copolymerizable ethylenically unsaturated monomer.

References Cited

UNITED STATES PATENTS

| | | | |
|---|---|---|---|
| 2,206,090 | 7/1940 | Haggenmacher | 204—181 |
| 2,345,543 | 3/1944 | Wohnsiedler et al. | 204—181 |
| 3,230,162 | 1/1966 | Gilchrist | 204—181 |
| 3,262,917 | 7/1966 | Maeder | 260—80.73 |
| 3,287,305 | 11/1966 | Maeder | 260—80.73 |
| 3,378,477 | 4/1968 | Gentles et al. | 204—181 |
| 3,385,839 | 5/1968 | Honig et al. | 260—80.73 |

OTHER REFERENCES

Fink et al., "Electrodeposition and Electrochemistry of the Deposition of Synthetic Resins," in Transactions of the Electrochemical Society, vol. 94, 1948, TP 250 A 54, 204–181, pp. 325 and 326.

HOWARD S. WILLIAMS, *Primary Examiner.*

E. ZAGARELLA, JR., *Assistant Examiner.*

U.S. Cl. X.R.

260—80.73